No. 814,460. PATENTED MAR. 6, 1906.
J. KRUCKEWITT.
COFFEE BOILER.
APPLICATION FILED MAR. 18, 1905.
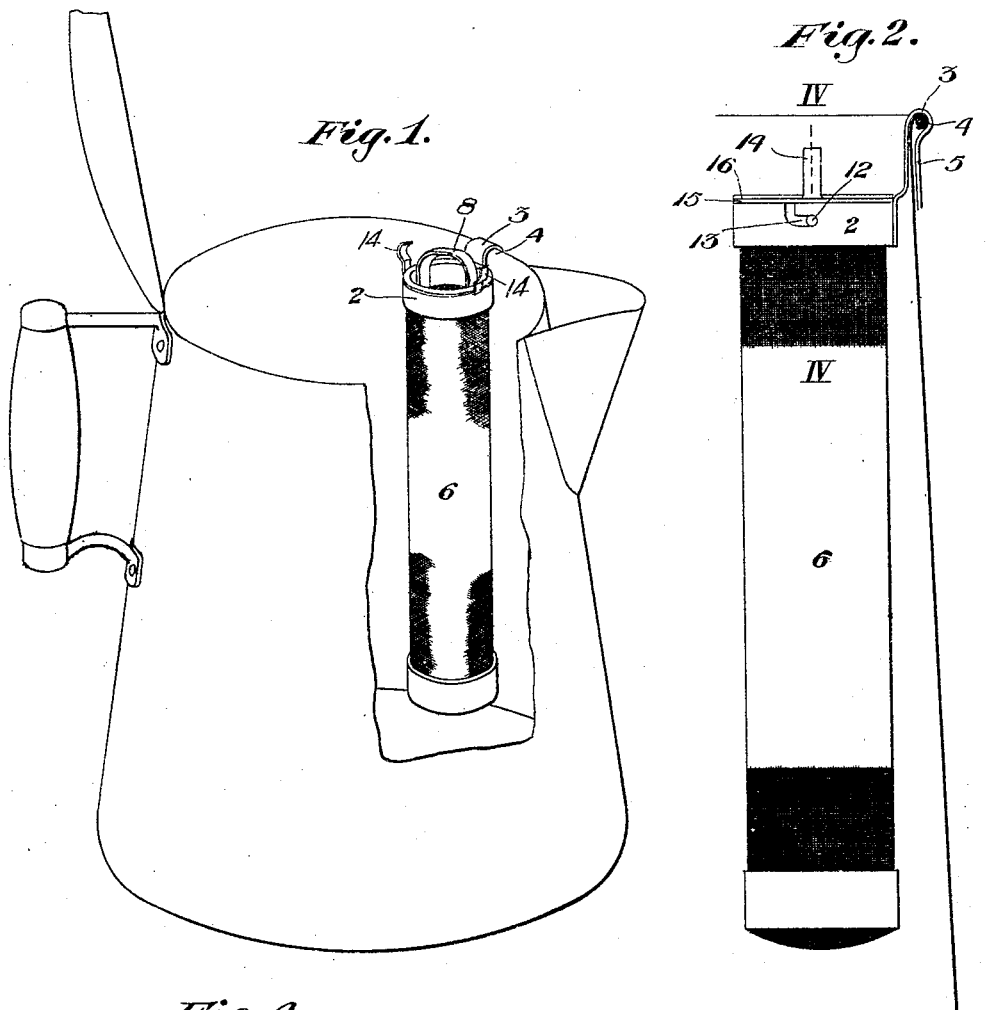
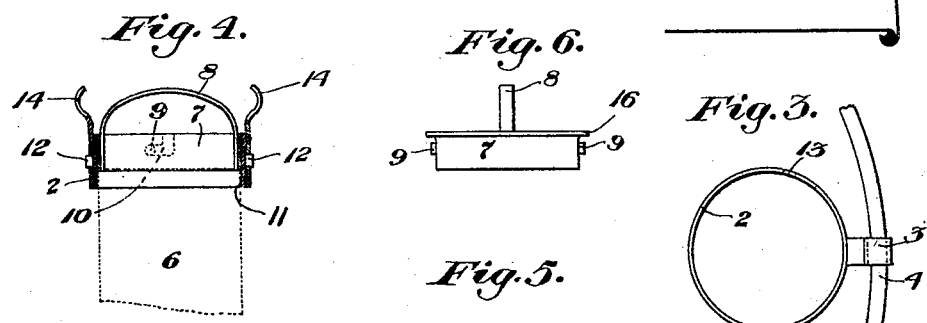
Witnesses:
E. R. Rodd.
Chas. S. Sipley.
Inventor:
John Kruckewitt
by C. M. Clark
his attorney

UNITED STATES PATENT OFFICE.

JOHN KRUCKEWITT, OF PITTSBURG, PENNSYLVANIA.

COFFEE-BOILER.

No. 814,460.　　　　　Specification of Letters Patent.　　　Patented March 6, 1906.

Application filed March 18, 1905. Serial No. 250,736.

*To all whom it may concern:*

Be it known that I, JOHN KRUCKEWITT, a citizen of the United States, residing at Pittsburg, in the county of Allegheny and State of Pennsylvania, have invented certain new and useful Improvements in Coffee-Boilers, of which the following is a specification, reference being had therein to the accompanying drawings, forming part of the specification, in which—

Figure 1 is a perspective view of a coffee-pot provided with my improved steeper. Fig. 2 is a side elevation of the device in position. Fig. 3 is a plan view of the supporting-ring. Fig. 4 is a vertical section on the line IV IV of Fig. 2. Fig. 5 is a similar section of the upper portion of the coffee-holder detached from the supporting-ring with the top removed. Fig. 6 is a side view of the top.

My invention consists of an improvement in perforate coffee or tea boilers or steepers adapted to contain the ground coffee or tea and to be suspended within a pot by means of a detachable ring, whereby the grounds are retained and removed without mixing with the water, the holder being capable of easy removal for emptying, cleansing, and recharging.

Referring now to the drawings, 2 is a ring of any suitable metal provided with a supporting-hook 3, adapted to be clamped upon the edge 4 of the pot, the hook being shaped to snugly embrace the edge and provided with a spring-terminal 5, insuring a tight engagement.

The coffee-holder consists of a cylindrical tube 6, of wire-gauze of suitable gage and size of openings, preferably quite fine, so as to prevent the escape of finely-ground coffee, while permitting free circulation and effect of the boiling water upon the contents. The lower end of the tube is permanently closed, while the upper end is provided with a removable top 7, having a bail or finger-pieces 8, by which the top may be attached in place or removed. For the purpose of securely attaching the top 7 to the top of the tube it is provided with locking-lugs 9, adapted to engage bayonet-joint slots 10 in one or both sides of a ring 11, forming the upper terminal of tube 6, as clearly shown. The top ring 11 is likewise provided with similar lugs 12, adapted to engage bayonet-joints 13 in one or both sides of supporting-ring 2 and is also provided with a bail or finger-pieces 14, by which the tube itself may be lifted bodily away from the ring. By this construction it will be seen that the tube may be readily removed from the interior of the pot without detaching the hook 3 and as readily inserted, thus obviating any trouble whatever. The tube-ring 11 is provided with a flange-lip 15, by which it is supported upon the upper edge of ring 2, while the top 7 is likewise provided with a similar lip 16, adapted to rest upon the top of the tube-ring 11, as shown.

The body portion and bottom of the tube 6 are composed entirely of wire-gauze or similar perforate material. The hook 3 is very thin, permitting the closing of the lid of the pot tightly, and the entire device is very simple, convenient, cheap, and efficient and will entirely prevent the mixture of the coffee-grounds with the coffee fluid, while still permitting the full strength of the coffee to be extracted by the process of boiling.

The device may be made in any size desired to suit the requirements of use, or it may be changed or varied in various details of construction by the skilled mechanic; but all such changes are to be considered as within the scope of the following claims.

What I claim is—

1. In a coffee-boiler, an apparatus comprising in combination a supporting-ring having a spring extremity adapted to embrace the top of a coffee-pot and to bind against its outer side, said ring being provided with oppositely-located bayonet-joint openings through its upper edge and outwardly-bowed upwardly-extending resilient lifting-lugs located opposite to each other, a removable coffee-tube of perforated material provided with oppositely-located supporting and locking abutments adapted to engage said bayonet-joint openings, and a cover for said tube of perforated material adapted to be set within its top and provided with an upwardly-bowed lifting-bail connected with opposite sides of said removable top, substantially as set forth.

2. The combination with a coffee-pot, of a coffee-boiler, comprising in combination a supporting-ring having a spring extremity adapted to embrace the top of the coffee-pot and to bind against its outer side, said ring being provided with oppositely-located bayonet-joint openings through its upper edge and outwardly-bowed upwardly-extending resilient lifting-lugs located opposite to each other, a removable coffee-tube of perforated material provided with oppositely-located supporting and locking abutments adapted to engage said bayonet-joint openings, and a cover for said tube of perforated material adapted to be set within its top and provided with an upwardly-bowed lifting-bail connected with opposite sides of said removable top, substantially as set forth.

In testimony whereof I affix my signature in presence of two witnesses.

JOHN KRUCKEWITT.

Witnesses:
C. M. CLARKE,
E. R. RODD.